United States Patent
Wang et al.

(10) Patent No.: US 10,951,332 B2
(45) Date of Patent: Mar. 16, 2021

(54) METHOD AND APPARATUS FOR COORDINATED MULTIPOINT (COMP) COMMUNICATION USING QUASI-CO-LOCATION

(71) Applicant: Huawei Technologies Co., Ltd., Shenzhen (CN)

(72) Inventors: Xiaona Wang, Chengdu (CN); Peng Guan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/521,376

(22) Filed: Jul. 24, 2019

(65) Prior Publication Data

US 2019/0349103 A1 Nov. 14, 2019

Related U.S. Application Data

(63) Continuation of application No. PCT/CN2017/118125, filed on Dec. 22, 2017.

(30) Foreign Application Priority Data

Jan. 26, 2017 (CN) .......................... 201710057695.0

(51) Int. Cl.
*H04L 1/00* (2006.01)
*H04B 17/345* (2015.01)
(Continued)

(52) U.S. Cl.
CPC ......... *H04B 17/345* (2015.01); *H04B 7/0626* (2013.01); *H04B 7/0632* (2013.01); *H04L 5/0048* (2013.01); *H04L 41/08* (2013.01)

(58) Field of Classification Search
CPC ..... H04L 5/0048; H04L 41/08; H04L 5/0092; H04L 5/00; H04B 17/345; H04B 7/0626;
(Continued)

(56) References Cited

U.S. PATENT DOCUMENTS

2014/0119266 A1 5/2014 Ng et al.
2015/0201369 A1* 7/2015 Ng ...................... H04W 64/003
370/254

(Continued)

FOREIGN PATENT DOCUMENTS

| CN | 103945447 A | 7/2014 |
|---|---|---|
| CN | 104247291 A | 12/2014 |
| CN | 104982063 A | 10/2015 |

OTHER PUBLICATIONS

LG Electronics, "Discussion on higher-layer signaling for NAICS", 3GPP TSG RAN WG1 Meeting #77, R1-142162, Seoul, Korea, May 19-23, 2014, 7 pages.

(Continued)

*Primary Examiner* — Abdelnabi O Musa
(74) *Attorney, Agent, or Firm* — Slater Matsil, LLP

(57) ABSTRACT

Embodiments of the present invention provide a method used for wireless communication and an apparatus. The method includes: configuring measurement parameters of channel state information for a terminal device, where the measurement parameters include a channel state information-reference signal configuration and a quasi-co-location indication, the channel state information-reference signal configuration includes configurations of at least two groups of antenna ports, and the quasi-co-location indication is used to indicate whether the at least two groups of antenna ports have a quasi-co-location relationship; and sending the measurement parameters to the terminal device.

20 Claims, 8 Drawing Sheets

(51) Int. Cl.
*H04B 7/06* (2006.01)
*H04L 5/00* (2006.01)
*H04L 12/24* (2006.01)

(58) Field of Classification Search
CPC .... H04B 7/0632; H04W 72/04; H04W 74/12; H04W 48/16; H04W 48/12
See application file for complete search history.

(56) References Cited

U.S. PATENT DOCUMENTS

| | | | | |
|---|---|---|---|---|
| 2015/0236801 | A1* | 8/2015 | Sun | H04L 27/2613 370/328 |
| 2015/0365154 | A1* | 12/2015 | Davydov | H04B 7/0632 370/329 |
| 2016/0227548 | A1* | 8/2016 | Nimbalker | H04L 1/0067 |
| 2016/0330004 | A1* | 11/2016 | Kim | H04L 5/0048 |
| 2019/0037429 | A1* | 1/2019 | Davydov | H04W 48/12 |

OTHER PUBLICATIONS

3GPP TS 36.331 V12.4.0 (Dec. 2014), 3rd Generation Partnership Project; Technical Specification Group Radio Access Network; Evolved Universal Terrestrial Radio Access (E-UTRA); Radio Resource Control (RRC); Protocol specification (Release 12), 410 pages.

3GPP TR 36.819 V11.2.0 (Sep. 2013), 3rd Generation Partnership Project; Technical Specification Group Radio Access Network; Coordinated multi-point operation for LTE physical layer aspects, (Release 11), 70 pages.

Intel Corporation, "Discussion an higher layer signaling for NAICS", 3GPP TSG-RAN WG1 Meeting #78, R1-142858, Dresden, Germany, Aug. 2014. XP050788343, 6 pages.

Fujitsu, "CSI-RS Patterns for Interference Measurements for CoMP," 3GPP TSG-RAN WG1 #68bis, R1-121188, Mar. 26-30, 2012, 9 pages, Jeju, Korea.

* cited by examiner

METHOD AND APPARATUS FOR COORDINATED MULTIPOINT (COMP) COMMUNICATION USING QUASI-CO-LOCATION

CROSS-REFERENCE TO RELATED APPLICATIONS

This application is a continuation of International Application No. PCT/CN2017/118125, filed on Dec. 22, 2017, which claims priority to Chinese Patent Application No. 201710057695.0, filed on Jan. 26, 2017. The disclosures of the aforementioned applications are hereby incorporated by reference in their entireties

TECHNICAL FIELD

This application relates to the field of communications technologies, and in particular, to a coordinated multipoint (CoMP) transmission technology in a wireless communications system.

BACKGROUND

In a coordinated multipoint (CoMP) transmission technology, a plurality of transmission points (TPs) that are separated at geographic locations coordinate to communicate with a terminal device, reducing interference to a terminal device at a cell edge and improving a cell edge throughput.

A downlink CoMP coordination manner includes joint processing (JP) and coordinated scheduling (CS)/coordinated beamforming (CB), and the JP manner includes joint transmission (JT), dynamic point selection (DPS), and a hybrid mode thereof. The JT means that a plurality of transmission points simultaneously send data to the terminal device, to improve signal receiving quality or a throughput. The DPS means that only one transmission point sends data to the terminal device on a particular time-frequency domain resource, and another transmission point may send data to the terminal device on a next subframe. The CS/CB means that data is sent from only one transmission point to the terminal device for a particular time-frequency domain resource. However, a decision of the CS/CB is coordinated by a plurality of transmission points.

To more properly schedule the terminal device, a TP needs to obtain state information of a channel from a current TP to the terminal device. The information is referred to as channel state information (CSI) in a long term evolution (LTE) system, and includes content such as a channel quality indicator (CQI), a rank indicator (RI), and a precoding matrix indicator (PMI). In downlink communication from the TP to the terminal device, the TP needs to send a channel state information-reference signal (CSI-RS) to the terminal device, and instruct the terminal device to measure and feed back corresponding CSI. In a coordinated multipoint transmission network, in addition to the CSI of the channel from the current serving TP to the terminal device, a network side further needs to obtain more information, for example, a degree of interference of a neighboring TP to the terminal device, so as to better perform coordinated transmission. Therefore, interference measurement is an important technology to support multi-TP coordination. In LTE, the interference measurement is performed by using a channel state information-interference measurement (CSI-IM) resource.

In LTE, for channel and interference measurement performed to support CoMP transmission, a resource configuration needs to be provided at a physical layer, and the resource configuration is transmitted to the terminal device at a higher layer by using signaling. A plurality of CSI processes are configured on the network side, and each CSI process corresponds to a transmission hypothesis, and corresponds to a resource configuration at the physical layer. Each CSI process has a CSI-RS resource and a CSI-IM resource. Then, the resource configuration corresponding to each process is transmitted to the terminal device. The terminal device feeds back a measurement result of each CSI process to help the network side perform coordination.

Because each CSI process needs a CSI-RS resource configuration, to support N-TP coordination, according to the solution in which a plurality of CSI measurement configurations are configured for the terminal device in LTE, $2^N-1$ CSI resources are required, and reference signal resource overheads are high. In addition, each resource configuration needs to be transmitted to the terminal device by using independent signaling, and signaling overheads are high. As network deployment is increasingly dense, an increasingly large quantity of TPs may be coordinated for a terminal device. Coordinated multipoint transmission implemented by using a channel and interference measurement mechanism of LTE causes excessively high resource overheads and signaling overheads.

SUMMARY

A technical problem to be resolved in embodiments of the present invention is to provide a method used for wireless communication and an apparatus, so as to reduce resource and signaling overheads caused by channel and interference measurement performed during coordinated multipoint transmission.

According to one aspect, an embodiment of the present invention provides a method used for wireless communication. The method includes configuring measurement parameters of channel state information for a terminal device, where the measurement parameters include a channel state information-reference signal configuration and a quasi-co-location indication, the channel state information-reference signal configuration includes configurations of at least two groups of antenna ports, and the quasi-co-location indication is used to indicate whether the at least two groups of antenna ports have a quasi-co-location relationship. The method also includes sending the measurement parameters to the terminal device.

In this implementation, when the measurement parameters of the channel state information are configured for the terminal device, the terminal device is instructed, by using the quasi-co-location indication, to measure the channel state information on each group of antenna ports, and it is unnecessary that each interference hypothesis corresponds to a channel state information process to perform separate resource and signaling configuration, reducing resource overheads and signaling overheads of a base station.

In an implementation, there is one channel state information-reference signal configuration.

In this implementation, the channel state information in coordinated multipoint transmission can be measured by using one channel state information-reference signal configuration, and it is unnecessary that each interference hypothesis corresponds to a channel state information process to perform separate resource and signaling configuration, reducing resource overheads and signaling overheads of a base station.

In another implementation, the channel state information-reference signal configuration includes a non zero power channel state information-reference signal configuration, and the non zero power channel state information-reference signal configuration is used to instruct the terminal device to measure the channel state information at time-frequency locations corresponding to each group of antenna ports in the channel state information-reference signal configuration.

In this implementation, the terminal device is instructed, by using the non zero power channel state information-reference signal configuration, to measure the channel state information at the time-frequency locations corresponding to each group of antenna ports, so that a channel measurement result of each group of antenna ports, namely, each transmission point, can be obtained and may be used to approximately estimate an interference measurement result.

In still another implementation, the configurations of the at least two groups of antenna ports are included in the non zero power channel state information-reference signal configuration.

In this implementation, the non zero power channel state information-reference signal configuration includes the at least two groups of antenna ports, and the terminal device is instructed, in combination with the quasi-co-location indication, to measure the channel state information at the time-frequency locations corresponding to each group of antenna ports.

In still another implementation, the channel state information-reference signal configuration further includes a zero power channel state information-reference signal configuration, the zero power channel state information-reference signal configuration is used to instruct the terminal device to measure interference outside a coordinating cluster at a time-frequency location corresponding to a corresponding antenna port, and the coordinating cluster includes a plurality of transmission points that perform coordinated transmission.

In this implementation, the terminal device is instructed, by using the zero power channel state information-reference signal configuration, to measure the interference outside the coordinating cluster at the time-frequency location corresponding to the corresponding antenna port. This can be used to more accurately determine a measurement result of interference of each transmission point to a serving transmission point.

In still another implementation, the quasi-co-location relationship includes one piece of the following information: channel state information reference signals sent by the at least two groups of antenna ports are from a same transmission point, and channel state information reference signals sent by the at least two groups of antenna ports are from a same beam group.

In this implementation, the terminal device measures the channel state information of each group of antenna ports by using the quasi-co-location indication of the antenna port groups, and the transmission point is transparent to the terminal device.

Because the same beam group may be from a same transmission point, and a transmission point may include a beam group, the terminal device measures the channel state information of each group of antenna ports by using the quasi-co-location indication of the antenna port groups, to be specific, may also obtain the channel state information of each transmission point.

In still another implementation, the measurement parameters include instruction information, used to instruct the terminal device to report one piece or more pieces of the following information: a channel energy value of each group of antenna ports in the channel state information-reference signal configuration, an interference energy value outside the coordinating cluster, a signal to interference plus noise ratio that is of each group of antenna ports in the channel state information-reference signal configuration and that is obtained after the interference outside the coordinating cluster is removed, and a signal to interference plus noise ratio that is of each group of antenna ports in the channel state information-reference signal configuration and that is obtained when there is the interference outside the coordinating cluster.

In this implementation, because a measurement parameter configuration of the channel state information is a configuration for an antenna port, content reported by the terminal device is also a channel and interference measurement result of each group of antenna ports, and the terminal device is instructed, by using the zero power channel state information-reference signal configuration, to measure the interference outside the coordinating cluster at the time-frequency location corresponding to the corresponding antenna port. Therefore, the signal to interference plus noise ratio of each group of antenna ports when the interference outside the coordinating cluster is removed or the signal to interference plus noise ratio of each group of antenna ports when there is the interference outside the coordinating cluster may be separately reported.

In still another implementation, a configuration of the antenna port includes a quantity of antenna ports, a resource configuration, and a time unit configuration.

In still another implementation, the sending the measurement parameters to the terminal device includes: sending the measurement parameters to the terminal device by using signaling, where the signaling includes at least one of the following: radio resource control (RRC) signaling, media access control (MAC) layer signaling, and downlink control information (DCI).

In this implementation, the measurement parameters are sent in various manners.

In still another implementation, the method further includes: receiving a measurement result of each group of antenna ports reported by the terminal device based on the instruction information; and obtaining channel and interference measurement results under various interference hypotheses through analysis based on the measurement result.

In this implementation, the channel state information-reference signal configuration and the quasi-co-location indication are used, and it is unnecessary that each interference hypothesis corresponds to a channel state information process to perform separate resource and signaling configuration. Then, a base station receives the measurement result of each group of antenna ports reported by the terminal device, and may obtain the channel and interference measurement results under various interference hypotheses through analysis, reducing resource overheads and signaling overheads of the base station.

According to another aspect, a base station is provided. The base station has a function of implementing base station behavior in the foregoing method. The function may be implemented by hardware, or may be implemented by hardware by executing corresponding software. The hardware or the software includes one or more modules corresponding to the function.

In a possible implementation, the base station includes a processing unit and a sending unit. The processing unit is configured to configure measurement parameters of channel state information for a terminal device, where the measurement parameters include a channel state information-reference signal configuration and a quasi-co-location indication, the channel state information-reference signal configuration includes configurations of at least two groups of antenna ports, and the quasi-co-location indication is used to indicate whether the at least two groups of antenna ports have a quasi-co-location relationship. The sending unit is configured to send the measurement parameters to the terminal device.

In another possible implementation, the base station includes a receiver, a transmitter, a memory, and a processor. The memory stores a set of program code, and the processor is configured to invoke the program code stored in the memory, to perform the following operations: configuring measurement parameters of channel state information for a terminal device, where the measurement parameters include a channel state information-reference signal configuration and a quasi-co-location indication, the channel state information-reference signal configuration includes configurations of at least two groups of antenna ports, and the quasi-co-location indication is used to indicate whether the at least two groups of antenna ports have a quasi-co-location relationship; and sending the measurement parameters to the terminal device by using the transmitter.

Based on a same inventive concept, for a problem resolving principle and beneficial effects of the apparatus, refer to the foregoing possible method implementations of the base station and the corresponding beneficial effects. Therefore, for implementation of the apparatus, refer to the implementation of the method. Details are not described again.

According to still another aspect, a method used for wireless communication is provided. The method includes receiving measurement parameters of channel state information from a base station, where the measurement parameters include a channel state information-reference signal configuration and a quasi-co-location indication, the channel state information-reference signal configuration includes configurations of at least two groups of antenna ports, and the quasi-co-location indication is used to indicate whether the at least two groups of antenna ports have a quasi-co-location relationship. The method also includes measuring the channel state information based on the measurement parameters.

In this implementation, the terminal device measures the channel state information on each group of antenna ports based on the quasi-co-location indication in the measurement parameters of the channel state information, and it is unnecessary that each interference hypothesis corresponds to a channel state information process to perform separate resource and signaling configuration, reducing resource overheads and signaling overheads of the base station.

In an implementation, there is one channel state information-reference signal configuration.

In this implementation, the channel state information in coordinated multipoint transmission can be measured by using one channel state information-reference signal configuration, and it is unnecessary that each interference hypothesis corresponds to a channel state information process to perform separate resource and signaling configuration, reducing resource overheads and signaling overheads of the base station.

In another implementation, the channel state information-reference signal configuration includes a non zero power channel state information-reference signal configuration, and the non zero power channel state information-reference signal configuration is used to instruct the terminal device to measure the channel state information at time-frequency locations corresponding to each group of antenna ports in the channel state information-reference signal configuration; and the measuring the channel state information based on the measurement parameters includes: if the at least two groups of antenna ports do not have the quasi-co-location relationship, measuring, based on the non zero power channel state information-reference signal configuration, the channel state information at the time-frequency locations corresponding to each group of antenna ports.

In this implementation, the terminal device measures, by using the non zero power channel state information-reference signal configuration, the channel state information at the time-frequency locations corresponding to each group of antenna ports, so that a channel measurement result of each group of antenna ports, namely, each transmission point, can be obtained and may be used to approximately estimate an interference measurement result.

In still another implementation, the configurations of the at least two groups of antenna ports are included in the non zero power channel state information-reference signal configuration.

In this implementation, the non zero power channel state information-reference signal configuration includes the at least two groups of antenna ports, and the terminal device measures, in combination with the quasi-co-location indication, the channel state information at the time-frequency locations corresponding to each group of antenna ports.

In still another implementation, the channel state information-reference signal configuration further includes a zero power channel state information-reference signal configuration, the zero power channel state information-reference signal configuration is used to instruct the terminal device to measure interference outside a coordinating cluster at a time-frequency location corresponding to a corresponding antenna port, and the coordinating cluster includes a plurality of transmission points that perform coordinated transmission; and the measuring the channel state information based on the measurement parameters further includes: measuring, based on the zero power channel state information-reference signal configuration, the interference outside the coordinating cluster at the time-frequency location corresponding to the corresponding antenna port.

In this implementation, the terminal device measures, by using the zero power channel state information-reference signal configuration, the interference outside the coordinating cluster at the time-frequency location corresponding to the corresponding antenna port. This can be used to more accurately determine a measurement result of interference of each transmission point to a serving transmission point.

In still another implementation, the quasi-co-location relationship includes one piece of the following information: channel state information reference signals sent by the at least two groups of antenna ports are from a same transmission point, and channel state information reference signals sent by the at least two groups of antenna ports are from a same beam group.

In this implementation, the terminal device measures the channel state information of each group of antenna ports by using the quasi-co-location indication of the antenna port groups, and the transmission point is transparent to the terminal device.

Because the same beam group may be from a same transmission point, and a transmission point may include a beam group, the terminal device measures the channel state information of each group of antenna ports by using the quasi-co-location indication of the antenna port groups, to be specific, may also obtain the channel state information of each transmission point.

In still another implementation, the measurement parameters include instruction information, used to instruct the terminal device to report one piece or more pieces of the following information: a channel energy value of each group of antenna ports in the channel state information-reference signal configuration, an interference energy value outside the coordinating cluster, a signal to interference plus noise ratio that is of each group of antenna ports in the channel state information-reference signal configuration and that is obtained after the interference outside the coordinating cluster is removed, and a signal to interference plus noise ratio that is of each group of antenna ports in the channel state information-reference signal configuration and that is obtained when there is the interference outside the coordinating cluster; and the method further includes: reporting a channel and interference measurement result to the base station based on the instruction information.

In this implementation, because a measurement parameter configuration of the channel state information is a configuration for an antenna port, content reported by the terminal device is also a channel and interference measurement result of each group of antenna ports, and the terminal device is instructed, by using the zero power channel state information-reference signal configuration, to measure the interference outside the coordinating cluster at the time-frequency location corresponding to the corresponding antenna port. Therefore, the signal to interference plus noise ratio of each group of antenna ports when the interference outside the coordinating cluster is removed or the signal to interference plus noise ratio of each group of antenna ports when there is the interference outside the coordinating cluster may be separately reported.

In still another implementation, a configuration of the antenna port includes a quantity of antenna ports, a resource configuration, and a time unit configuration.

According to yet another aspect, a terminal device is provided. The terminal device has a function of implementing terminal device behavior in the foregoing method. The function may be implemented by hardware, or may be implemented by hardware by executing corresponding software. The hardware or the software includes one or more modules corresponding to the function.

In a possible implementation, the terminal device includes a receiving unit and a measurement unit. The receiving unit is configured to receive measurement parameters of channel state information from a base station, where the measurement parameters include a channel state information-reference signal configuration and a quasi-co-location indication, the channel state information-reference signal configuration includes configurations of at least two groups of antenna ports, and the quasi-co-location indication is used to indicate whether the at least two groups of antenna ports have a quasi-co-location relationship. The measurement unit is configured to measure the channel state information based on the measurement parameters.

In another possible implementation, the terminal device includes a receiver, a transmitter, a memory, and a processor. The memory stores a set of program code, and the processor is configured to invoke the program code stored in the memory, to perform the following operations: receiving measurement parameters of channel state information from a base station by using the receiver, where the measurement parameters include a channel state information-reference signal configuration and a quasi-co-location indication, the channel state information-reference signal configuration includes configurations of at least two groups of antenna ports, and the quasi-co-location indication is used to indicate whether the at least two groups of antenna ports have a quasi-co-location relationship; and measuring the channel state information based on the measurement parameters.

Based on a same inventive concept, for a problem resolving principle and beneficial effects of the apparatus, refer to the foregoing possible method implementations of the terminal device and the corresponding beneficial effects. Therefore, for implementation of the apparatus, refer to the implementation of the method. Details are not described again.

According to still yet another aspect of this application, a computer-readable storage medium is provided. The computer-readable storage medium stores an instruction, and when the instruction runs on a computer, the computer performs the methods in the foregoing aspects.

According to a further aspect of this application, a computer program product including an instruction is provided. When the computer program product runs on a computer, the computer performs the methods in the foregoing aspects.

BRIEF DESCRIPTION OF THE DRAWINGS

To describe the technical solutions in the embodiments of the present invention more clearly, the following describes the accompanying drawings required in the embodiments of the present invention.

DETAILED DESCRIPTION OF ILLUSTRATIVE EMBODIMENTS

The following describes the embodiments of the present invention with reference to the accompanying drawings in the embodiments of the present invention.

Figure 1:
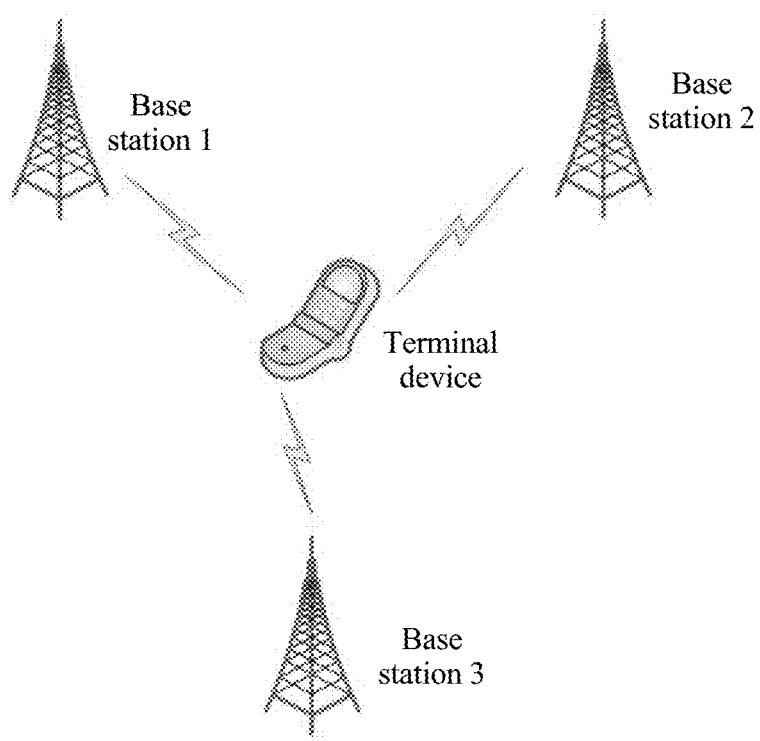
FIG. 1 is a schematic architectural diagram of a communications system according to an embodiment of the present invention.

FIG. 1 is a schematic architectural diagram of a communications system according to an embodiment of the present invention. The communications system includes a plurality of base stations and a plurality of terminal devices. FIG. 1 shows that three base stations coordinately communicate with a terminal device. The communications system may be a global system for mobile communications (GSM), a code division multiple access (CDMA) system, a wideband code division multiple access (WCDMA) system, a worldwide interoperability for microwave access (WiMAX) system, a long term evolution (LTE) system, a 5G communications system (for example, a new radio (NR) system, a communications system that combines a plurality of communications technologies (for example, a communications system that combines an LTE technology and an NR technology)), or a subsequent evolved communications system.

A terminal device in this application is a device that has a wireless communication function, and may be a handheld device that has a wireless communication function, an in-vehicle device, a wearable device, a computing device, another processing device connected to a wireless modem, or the like. In different networks, the terminal device may have different names, for example, user equipment, an access terminal, a subscriber unit, a subscriber station, a mobile station, a mobile console, a remote station, a remote terminal, a mobile device, a user terminal, a terminal, a wireless communications device, a user agent or a user apparatus, a cellular phone, a cordless phone, a session initiation protocol (SIP) phone, a wireless local loop (WLL) station, a personal digital assistant (PDA), and a terminal device in a 5G network or a future evolved network.

A base station in this application may also be referred to as a base station device, and is a device that is deployed in a radio access network to provide a wireless communication function. The base station includes but is not limited to a base station (for example, a Base Transceiver Station (BTS), a NodeB (NB), an evolved NodeB (eNB or eNodeB), a transmission node or a transmission reception point (TRP or TP) or a next generation NodeB (generation nodeB, gNB) in an NR system, and a base station or a network device in a future communications network), a relay station, an access point, an in-vehicle device, a wearable device, a wireless fidelity (Wi-Fi) station, a wireless backhaul node, a small base station, a micro base station, and the like.

It should be noted that the TP is an apparatus that has a transceiver function. For example, the TP may be the foregoing base station, a relay node, an access point, a remote radio head (RRH), a radio remote unit (RRU), various small base stations controlled by a macro base station, or the like. The base station or a network controller of the base station controls a plurality of TPs to perform coordinated transmission. The TP includes one or more beams. One or more beams sent from one TP may be referred to as a beam group, and different TPs indicate different beam groups. To more properly schedule the terminal device, the base station instructs the terminal device to perform corresponding measurement under various interference hypotheses. The various interference hypotheses include that when a TP in a coordinating cluster provides a service, no other TP in the coordinating cluster interferes with the serving TP, or one or more other TPs in the coordinating cluster interfere with the serving TP, or all other TPs in the coordinating cluster interfere with the serving TP. The coordinating cluster includes a plurality of TPs that perform coordinated transmission.

If in a scenario in which only one TP provides a service at a same moment, in an existing LTE system, to instruct the terminal device to perform corresponding measurement under different interference hypotheses, each interference hypothesis corresponds to a CSI process, as shown in Table 1.

TABLE 1

| Interference hypothesis corresponding to each CSI process | | | | |
|---|---|---|---|---|
| | Interference hypothesis | TP1 hypothesis | TP2 hypothesis | TP3 hypothesis |
| A serving TP is a TP1 | | | | |
| CSI process 1: | Neither a TP2 nor a TP3 interferes | Data transmission | Silence | Silence |
| CSI process 2: | The TP3 interferes | Data transmission | Silence | Interference |
| CSI process 3: | The TP2 interferes | Data transmission | Interference | Silence |
| CSI process 4: | Both the TP2 and the TP3 interfere | Data transmission | Interference | Interference |
| A serving TP is a TP2 | | | | |
| CSI process 1: | Neither the TP1 nor the TP3 interferes | Silence | Data transmission | Silence |
| CSI process 2: | The TP3 interferes | Silence | Data transmission | Interference |
| CSI process 3: | The TP1 interferes | Interference | Data transmission | Silence |
| CSI process 4: | Both the TP1 and the TP3 interfere | Interference | Data transmission | Interference |
| A serving TP is a TP3 | | | | |
| CSI process 1: | Neither the TP1 nor the TP2 interferes | Silence | Silence | Data transmission |
| CSI process 2: | The TP2 interferes | Silence | Interference | Data transmission |
| CSI process 3: | The TP1 interferes | Interference | Silence | Data transmission |
| CSI process 4: | Both the TP1 and the TP2 interfere | Interference | Interference | Data transmission |

In Table 1, a silence state indicates that the TP does not interfere with the serving TP, or the terminal device does not measure an interference signal of the TP for the serving TP.

Figure 2A:
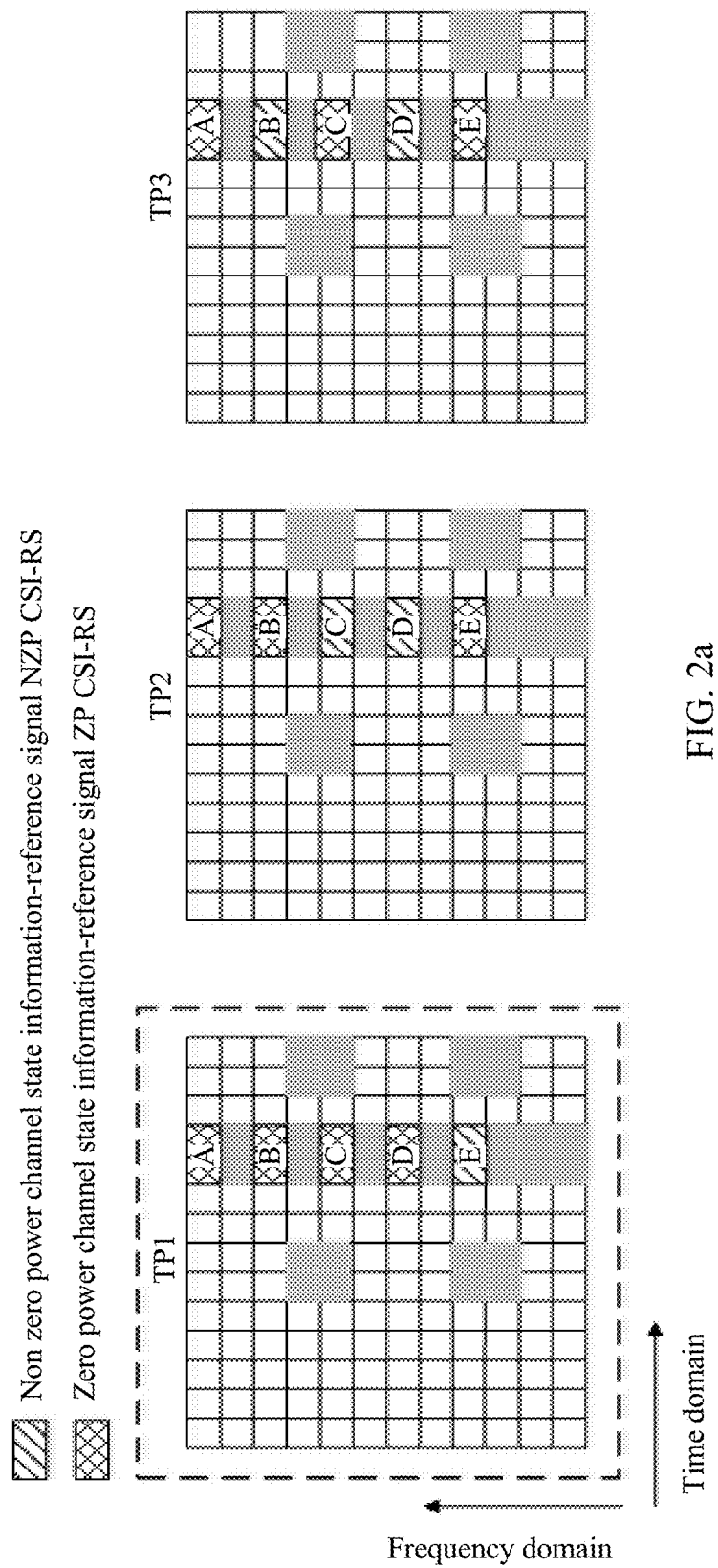
FIG. 2a to FIG. 2c are respectively examples of schematic diagrams of resource configurations when a TP1, a TP2, and a TP3 provide a service.
Figure 2B:
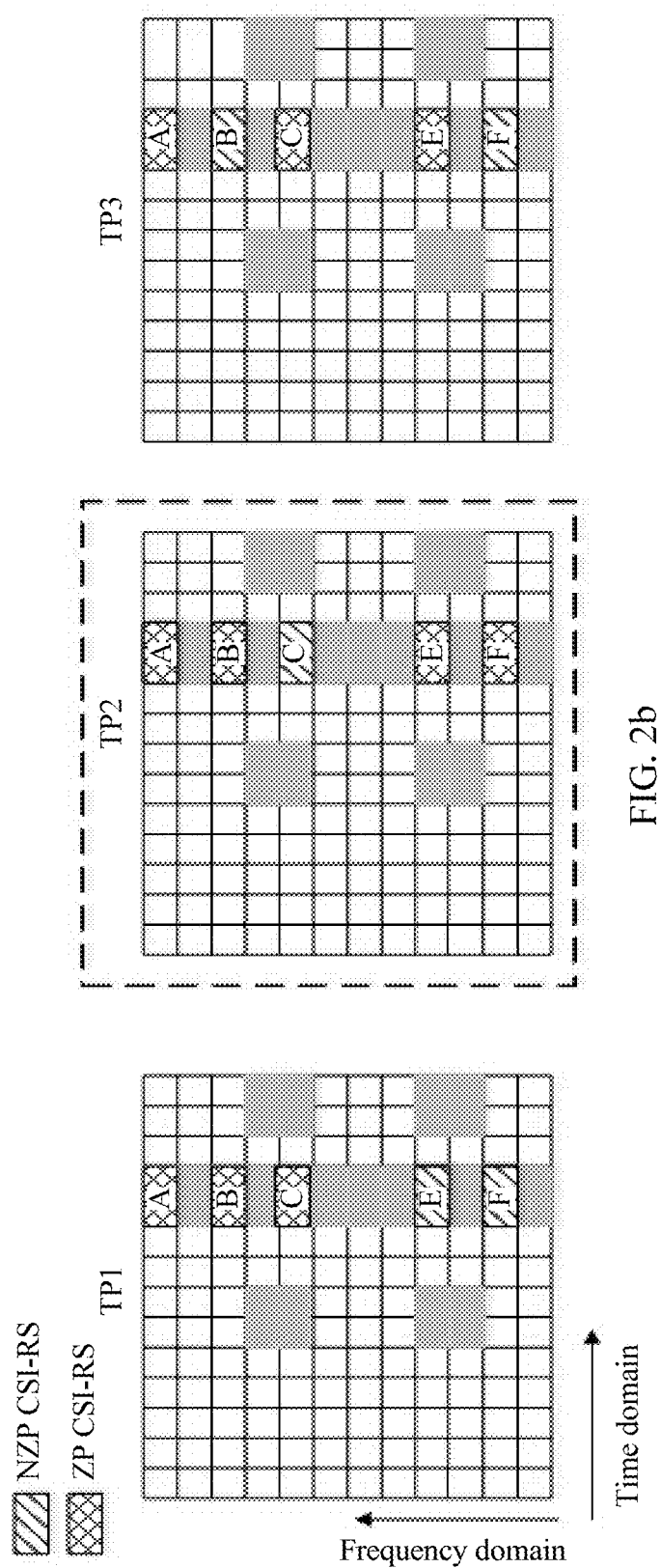
Figure 2C:
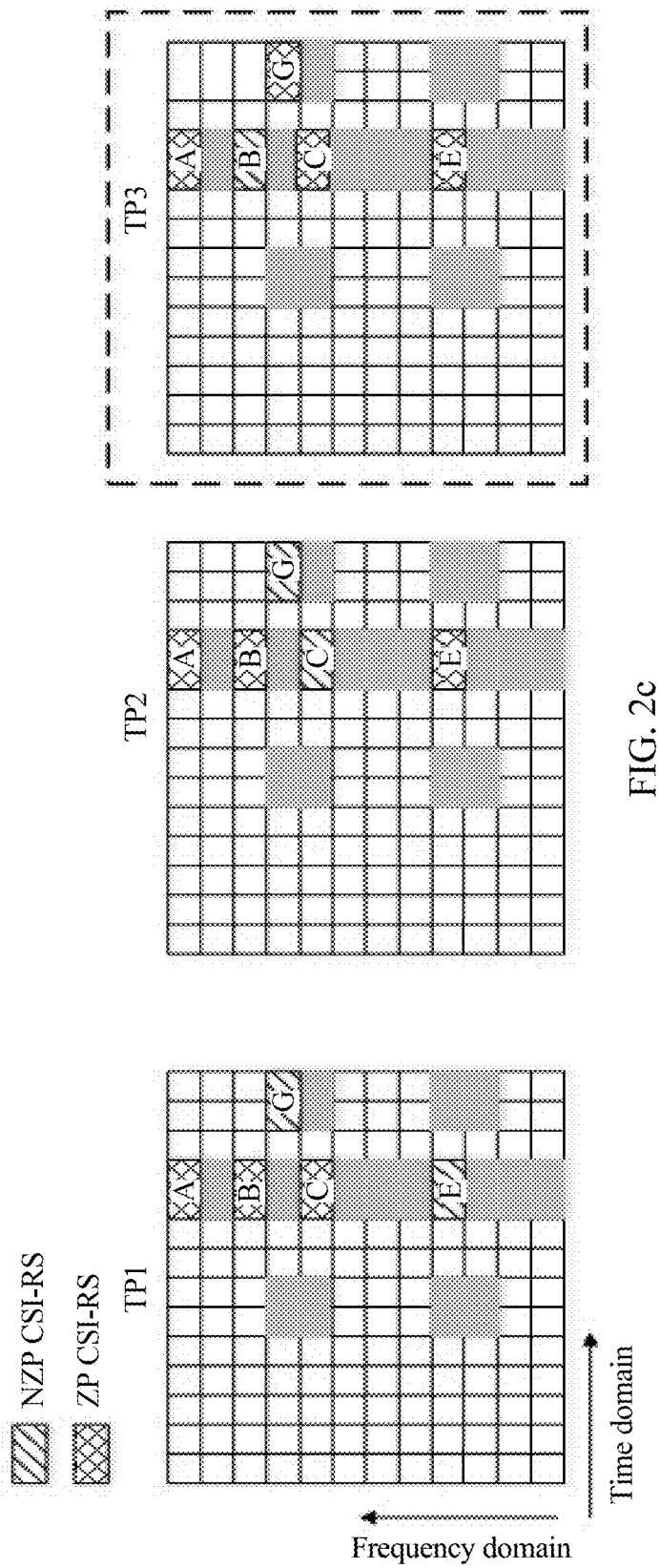

Each CSI process includes a CSI-RS resource for channel measurement and a CSI-IM resource for interference measurement. A scenario shown in FIG. 1 is used as an example. When each TP provides a service, a network side correspondingly configures four CSI processes for the terminal device to separately perform measurement under four interference hypotheses. Channel and interference measurement is implemented by configuring a non zero power channel state information-reference signal (NZP CSI-RS) and a zero power channel state information-reference signal (ZP CSI-RS). The ZP CSI-RS indicates a zero power at a resource location, that is, the TP is silent. On the contrary, the NZP CSI-RS indicates a non zero power at a resource location, and the TP is transmitting data or interferes with another TP. ZP CSI-RS and NZP CSI-RS configurations that support coordinated multipoint transmission in Table 1 are shown in Table 2.

figure, the TP2 corresponds to four CSI processes, and the TP2 sends the NZP CSI-RS at resource locations C and D, and sends the ZP CSI-RS at resource locations A and B, that is, is silent at the resource locations A and B. In a right figure, the TP3 corresponds to four CSI processes, and the TP3 sends the NZP CSI-RS at resource locations B and D, and sends the ZP CSI-RS at resource locations A and C, that is, is silent at the resource locations A and C. Cases of FIG. 2b and FIG. 2c are analogous. When performing CoMP transmission, the TP serves more than one terminal device. However, a resource element (RE) used to send a reference signal is limited, and each resource location may be further used for channel or interference measurement of another terminal device. Therefore, in the coordinating cluster with a quantity 3 of coordinated TPs, to implement multipoint transmission, seven CSI-RS/IM resource locations need to be reserved on the network side. Through calculation, to support N-TP coordination, $2^N-1$ resources are required according to the solution in which a plurality of CSI measurement configurations are configured for the terminal device in LTE.

TABLE 2

ZP CSI-RS and NZP CSI-RS configurations that support coordinated multipoint transmission and that are corresponding to Table 1

| A serving TP is a TP1 | CSI-RS | TP1 | CSI-IM | TP1 | TP2 | TP3 |
|---|---|---|---|---|---|---|
| CSI process 1: | E | NZP CSI-RS | A | ZP CSI-RS | ZP CSI-RS | ZP CSI-RS |
| CSI process 2: | E | NZP CSI-RS | B | ZP CSI-RS | ZP CSI-RS | NZP CSI-RS |
| CSI process 3: | E | NZP CSI-RS | C | ZP CSI-RS | NZP CSI-RS | ZP CSI-RS |
| CSI process 4: | E | NZP CSI-RS | D | ZP CSI-RS | NZP CSI-RS | NZP CSI-RS |
| A serving TP is a TP2 | CSI-RS | TP2 | CSI-IM | TP1 | TP2 | TP3 |
| CSI process 1: | C | NZP CSI-RS | A | ZP CSI-RS | ZP CSI-RS | ZP CSI-RS |
| CSI process 2: | C | NZP CSI-RS | B | ZP CSI-RS | ZP CSI-RS | NZP CSI-RS |
| CSI process 3: | C | NZP CSI-RS | E | NZP CSI-RS | ZP CSI-RS | ZP CSI-RS |
| CSI process 4: | C | NZP CSI-RS | F | NZP CSI-RS | ZP CSI-RS | NZP CSI-RS |
| A serving TP is a TP3 | CSI-RS | TP2 | CSI-IM | TP1 | TP2 | TP3 |
| CSI process 1: | B | NZP CSI-RS | A | ZP CSI-RS | ZP CSI-RS | ZP CSI-RS |
| CSI process 2: | B | NZP CSI-RS | C | ZP CSI-RS | NZP CSI-RS | ZP CSI-RS |
| CSI process 3: | B | NZP CSI-RS | E | NZP CSI-RS | ZP CSI-RS | ZP CSI-RS |
| CSI process 4: | B | NZP CSI-RS | G | NZP CSI-RS | NZP CSI-RS | ZP CSI-RS |

A, B, C, D, E, F, and G in Table 2 each represent an independent CSI-RS/IM resource location. In specific configuration, FIG. 2a to FIG. 2c respectively illustrate resource configurations when the TP1, the TP2, and the TP3 provide a service. In FIG. 2a, when the TP1 provides a service, the terminal device performs, at the resource location E, channel measurement on a CSI-RS sent by the TP1, and performs interference measurement at resource locations A, B, C, and D. Therefore, in a left figure, for the TP1, the TP1 sends the NZP CSI-RS at the resource location E, and sends the ZP CSI-RS at the resource locations A, B, C, and D, that is, is silent at the resource locations A, B, C, and D. In a middle It should be noted that a reference signal configuration in existing LTE includes a quantity of antenna ports of a reference signal (which may be 1, 2, 4, 8, 12, or 16), a time-frequency resource, a reference signal period (which may be 5 ms, 10 ms, 20 ms, 40 ms, or 80 ms), and the like. In LTE, it is stipulated that 40 REs are usually occupied to send the reference signal. If a reference signal configuration includes one or two antenna ports, one reference signal resource may include REs on two consecutive symbols. Therefore, there may be a maximum of 40/2=20 different reference signal configurations. If a reference signal configuration includes four/eight antenna ports, one reference signal resource may include four/eight REs, and there may be a maximum of ten/five different reference signal configurations. To be specific, limited reference signal configurations cannot satisfy resource allocation of the CoMP transmission when there is a relatively large quantity of coordinated TPs.

After a resource configuration of the channel and interference measurement at a physical layer is completed, each CSI measurement configuration needs an independent signal configuration, and the independent signal configuration is sent to the terminal device for measurement.

The terminal device measures each CSI process and reports a measurement result. An interference measurement result reported by the terminal device is shown in Table 3.

TABLE 3

Interference measurement result reported by a terminal device in LTE

| A serving TP is a TP1 | CSI-RS | CSI-IM | Reporting of a terminal device (an RI and a PMI are optional) | Example |
|---|---|---|---|---|
| CSI process 1: | E | A | CQI, RI, and PMI | CQI = $S_E/I_A$ |
| CSI process 2: | E | B | CQI, RI, and PMI | CQI = $S_E/I_B$ |
| CSI process 3: | E | C | CQI, RI, and PMI | CQI = $S_E/I_C$ |
| CSI process 4: | E | D | CQI, RI, and PMI | CQI = $S_E/I_D$ |
| | CSI-RS | CSI-IM | TP1 | |
| A serving TP is a TP2 | | | | |
| CSI process 1: | C | A | CQI, RI, and PMI | CQI = $S_C/I_A$ |
| CSI process 2: | C | B | CQI, RI, and PMI | CQI = $S_C/I_B$ |
| CSI process 3: | C | E | CQI, RI, and PMI | CQI = $S_C/I_E$ |
| CSI process 4: | C | F | CQI, RI, and PMI | CQI = $S_C/I_F$ |
| A serving TP is a TP3 | | | | |
| CSI process 1: | B | A | CQI, RI, and PMI | CQI = $S_B/I_A$ |
| CSI process 2: | B | C | CQI, RI, and PMI | CQI = $S_B/I_C$ |
| CSI process 3: | B | E | CQI, RI, and PMI | CQI = $S_B/I_E$ |
| CSI process 4: | B | G | CQI, RI, and PMI | CQI = $S_B/I_G$ |

In Table 3, if the RI is 1 and the PMI is oriented to a maximum direction, the CQI of the CSI process 1 configured for the serving TP1 is a ratio of signal energy ($S_E$) measured at E to interference energy ($I_A$) measured at A, and a CQI of each CSI process when another TP provides a service is calculated in a similar way. The CQI may be considered as a quantized SINR of the CSI process 1. It should be noted that all interference amounts in Table 3 are actually measured through the CSI-IM.

It can be learned that in the existing LTE system, to support channel and interference measurement of three-TP coordination, reference signal resource overheads and signaling overheads are very high.

The embodiments of the present invention provide an information indication method and a channel and interference measurement method in coordinated multipoint transmission. When measurement parameters of channel state information are configured for a terminal device, the terminal device is instructed, by using a quasi-co-location indication, to measure the channel state information on each group of antenna ports, and it is unnecessary that each interference hypothesis corresponds to a channel state information process to perform separate resource and signaling configuration, reducing resource overheads and signaling overheads of a base station.

Figure 3:
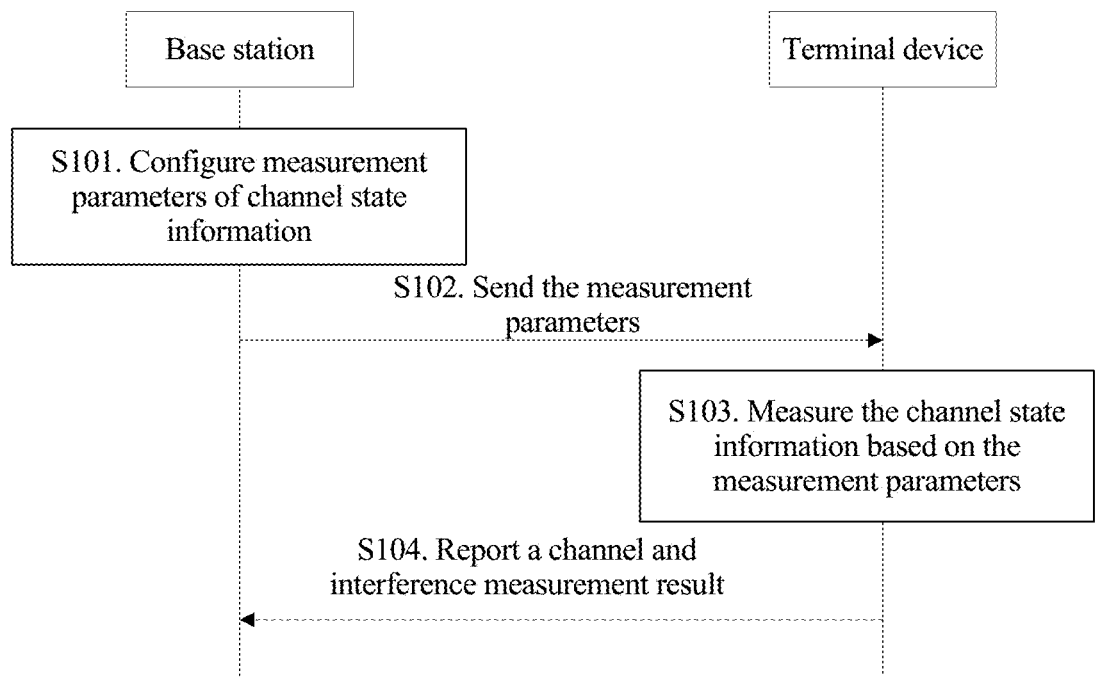
FIG. 3 is a schematic interaction diagram of an information indication and channel and interference measurement method according to an embodiment of the present invention.

FIG. 3 is a schematic interaction diagram of an information indication and channel and interference measurement method according to an embodiment of the present invention. The method includes the following steps.

S101. A base station configures measurement parameters of channel state information CSI for a terminal device.

When the base station needs to perform channel and interference measurement for coordinated multipoint transmission, the base station preconfigures the measurement parameters of the channel state information. The measurement parameters include a channel state information-reference signal configuration and a quasi-co-location (QCL) indication, the channel state information-reference signal (CSI-RS) configuration includes configurations of at least two groups of antenna ports, and the quasi-co-location indication is used to indicate whether the at least two groups of antenna ports have a quasi-co-location relationship.

The quasi-co-location relationship is used to indicate that a plurality of resources have one or more same or similar communication features. For a plurality of resources that have the quasi-co-location relationship, a same or similar communication configuration may be used. For example, if two antenna ports have the quasi-co-location relationship, a large-scale channel property in which one port transmits a symbol may be inferred from a large-scale channel property in which the other port transmits a symbol. The large-scale property may include delay spread, an average delay, Doppler spread, Doppler shift, an average gain, a receive beam number of the terminal device, transmit/receive channel correlation, an angle of arrival of a received signal, spatial correlation of a receiver antenna, a dominant angle of arrival (AoA), an average angle of arrival, AoA spread, and the like.

For example, if channel state information reference signals sent by the at least two groups of antenna ports are from a same transmission point, it may be considered that the at least two groups of antenna ports have the quasi-co-location relationship. For another example, if channel state information reference signals sent by the at least two groups of antenna ports are from a same beam group, it may be considered that the at least two groups of antenna ports have the quasi-co-location relationship.

In an example, the base station may configure one channel state information-reference signal (CSI-RS) configuration for the terminal device.

A configuration of the antenna port includes a quantity of antenna ports, a resource configuration, and a time unit configuration. For example, the quantity of antenna ports is 1, 2, 4, 8, 12, or 16. Different antenna port groups correspond to different TPs. The resource configuration may be a time-frequency resource configuration. The time-frequency resource configuration indicates a symbol time and a sub-carrier frequency of a reference signal appeared on a resource block. For example, refer to an existing LTE system to use a resource element RE as a unit. The time unit configuration is a minimum scheduled time granularity. For example, a time unit may be set according to a system requirement. For example, the time unit may be a frame, a subframe, a slot, or a mini-slot.

In an implementation, the channel state information-reference signal (CSI-RS) configuration includes a non zero power channel state information-reference signal configuration. The configuration of the antenna port is included in the non zero power channel state information-reference signal configuration. The non zero power channel state information-reference signal configuration is used to instruct the terminal device to measure the channel state information at a time-frequency location corresponding to an antenna port. If the quasi-co-location indication indicates that the different antenna port groups do not have the quasi-co-location relationship, the terminal device separately measures non zero power channel state information-reference signals that are sent at time-frequency locations corresponding to each group of antenna ports, and obtains a channel measurement result of each group of antenna ports, so that the base station can obtain an interference measurement result of each group of antenna ports through estimation based on the channel measurement result. If the quasi-co-location indication indicates that the different antenna port groups have the quasi-co-location relationship, joint measurement is performed on all antenna port groups based on a channel and interference measurement method in existing LTE. However, for such a measurement result, the base station cannot analyze interference measurement results under various interference hypotheses. It should be noted that, for an English abbreviation of a non zero power channel state information-reference signal, refer to an English abbreviation NZP CSI-RS in the existing LTE system, but another English abbreviation may also be used. The full meaning of the non zero power channel state information-reference signal as disclosed in the Chinese priority application is hereby incorporated by reference.

In another implementation, the channel state information-reference signal configuration further includes a zero power channel state information-reference signal (ZP CSI-RS) configuration, the zero power channel state information-reference signal configuration is used to instruct the terminal device to measure interference outside a coordinating cluster at a time-frequency location corresponding to a corresponding antenna port, and the coordinating cluster includes a plurality of transmission points that perform coordinated transmission. The channel measurement result of each group of antenna ports includes measurement on the interference outside the coordinating cluster, and to more accurately measure and obtain interference caused by another TP to a serving TP, the interference outside the coordinating cluster needs to be removed. Therefore, further, in this implementation, the interference outside the coordinating cluster may be separately measured, and is used to further accurately obtain, based on the interference measurement result of each group of antenna ports obtained through estimation, interference caused by a TP corresponding to each group of antenna ports in the coordinating cluster.

In still another implementation, the measurement parameters further include instruction information, used to instruct the terminal device to report one piece or more pieces of the following information: a channel energy value of each group of antenna ports in the channel state information-reference signal configuration, an interference energy value outside the coordinating cluster, a signal to interference plus noise ratio that is of each group of antenna ports in the channel state information-reference signal configuration and that is obtained after the interference outside the coordinating cluster is removed, and a signal to interference plus noise ratio that is of each group of antenna ports in the channel state information-reference signal configuration and that is obtained when there is the interference outside the coordinating cluster. Because a measurement parameter configuration of the channel state information is the configuration for the antenna port, content reported by the terminal device is also a channel and interference measurement result of each group of antenna ports, and the terminal device is instructed, by using the zero power channel state information-reference signal configuration, to measure the interference outside the coordinating cluster at the time-frequency location corresponding to the corresponding antenna port. Therefore, the signal to interference plus noise ratio of each group of antenna ports when the interference outside the coordinating cluster is removed or the signal to interference plus noise ratio of each group of antenna ports when there is the interference outside the coordinating cluster may be separately reported.

S102. The base station sends the measurement parameters to the terminal device.

After configuring the measurement parameters of the channel state information, the base station sends the measurement parameters to the terminal device, and specifically sends the measurement parameters to the terminal device by using signaling, where the signaling includes at least one of the following: radio resource control (RRC) signaling, media access control (MAC) layer signaling, and downlink control information (DCI).

An example of the RRC signaling and a resource configuration in which the NZP CSI-RS is the non zero power channel state information-reference signal and the ZP CSI-RS is the zero power channel state information-reference signal is used for description below. The base station may define control signaling (the measurement parameters of the channel state information are included in the control signaling) in a form of an RRC IE in the RRC signaling.

The NZP CSI-RS configuration is specifically represented as an RRC IE, for example, csi-RS-ConfigNZP. As shown in Table 4, several related configuration parameters are listed.

TABLE 4

| csi-RS-ConfigNZP RRC IE | |
| --- | --- |
| csi-RS-ConfigNZPId-r11 | |
| antennaPortsCount-r11 | A quantity of antenna ports |
| resourceConfig-r11 | Resource configuration |
| timeunitConfig-r11 | Time unit configuration |

In Table 4, for a time unit, refer to the time unit that is described in S101 and that may be set according to the system requirement, for example, the frame, the subframe, the slot, or the mini-slot.

The ZP CSI-RS configuration is specifically represented as an RRC IE, for example, csi-RS-ConfigZP. As shown in Table 5, several related configuration parameters are listed.

TABLE 5

| csi-RS-ConfigZP RRC IE | |
|---|---|
| csi-RS-ConfigZPId-r11 | |
| resourceConfigZP-r11 | Resource configuration |
| timeunitConfigZP-r11 | Time unit configuration |

Table 6 shows an example in which the measurement parameters are sent to the terminal device.

TABLE 6

| Notification manner of an NZP CSI-RS configuration | |
|---|---|
| nzp-resourceConfig | NZP CSI-RS configuration, where the configuration includes information about at least two groups of antenna ports |
| quasi-co-location | Quasi-co-location indication |

The base station indicates the measurement parameters to the terminal device by sending the NZP CSI-RS configuration to the terminal device. The NZP CSI-RS configuration may include a non zero power resource configuration nzp-resourceConfig and the quasi-co-location indication quasi-co-location. The non zero power resource configuration includes information or the configurations of the at least two groups of antenna ports, for example, as shown in Table 4, the quantity of antenna ports, resource configuration information, and time unit configuration information. After learning the non zero power resource configuration, the terminal device may learn a time-frequency location corresponding to an antenna port in the non zero power resource configuration and then may perform channel measurement at the corresponding time-frequency location.

The quasi-co-location indication quasi-co-location (QCL for short) is used to indicate whether antenna port groups indicated in the NZP CSI-RS configuration have the quasi-co-location relationship. For example, one or more information bits are set to different values, for example, set to 0 or 1, to indicate that the at least two groups of antenna ports in the NZP CSI-RS configuration do not have the quasi-co-location relationship. The terminal device separately performs channel measurement and interference estimation on reference signals of each group of antenna ports based on the NZP CSI-RS configuration and the quasi-co-location indication.

S103. The terminal device measures the channel state information based on the measurement parameters.

The terminal device receives the measurement parameters of the channel state information from the base station, and obtains the channel state information-reference signal configuration and the quasi-co-location indication that are included in the measurement parameters. Based on a value of the quasi-co-location indication, if the quasi-co-location indication is that the at least two groups of antenna ports included in the channel state information-reference signal configuration do not have the quasi-co-location relationship, the terminal device measures the reference signals sent by each group of antenna ports, to obtain the channel measurement result of each group of antenna ports.

In an implementation, the channel state information-reference signal configuration includes the non zero power channel state information-reference signal configuration, and the non zero power channel state information-reference signal configuration includes the configurations of the at least two groups of antenna ports. The non zero power channel state information-reference signal configuration is used to instruct the terminal device to measure the channel state information at the time-frequency locations corresponding to each group of antenna ports. To be specific, if the quasi-co-location indication is that the at least two groups of antenna ports included in the channel state information-reference signal configuration do not have the quasi-co-location relationship, the terminal device separately measures the non zero power channel state information-reference signals that are sent at the time-frequency locations corresponding to each group of antenna ports, that is, obtains the channel measurement result of each group of antenna ports through measurement, so that the base station can obtain the interference measurement result of each group of antenna ports through estimation based on the channel measurement result.

In another implementation, the channel state information-reference signal configuration further includes the zero power channel state information-reference signal configuration, the zero power channel state information-reference signal configuration is used to instruct the terminal device to measure the interference outside the coordinating cluster at the time-frequency location corresponding to the corresponding antenna port, and the coordinating cluster includes the plurality of transmission points that perform coordinated transmission. The channel measurement result of each group of antenna ports includes the measurement on the interference outside the coordinating cluster, and to more accurately measure and obtain the interference caused by the another TP to a serving TP, the interference outside the coordinating cluster needs to be removed. Therefore, further, in this implementation, the terminal device may separately measure the interference outside the coordinating cluster, to further accurately obtain, based on the interference measurement result of each group of antenna ports obtained through estimation, the interference caused by the TP corresponding to each group of antenna ports in the coordinating cluster.

S104. The terminal device reports a channel and interference measurement result to the base station based on instruction information.

The terminal device reports the channel and interference measurement result to the base station based on the instruction information in the measurement parameters. The terminal device reports the one piece or more pieces of the following information: the channel energy value of each group of antenna ports in the channel state information-reference signal configuration, the interference energy value outside the coordinating cluster, the signal to interference plus noise ratio that is of each group of antenna ports in the channel state information-reference signal configuration and that is obtained after the interference outside the coordinating cluster is removed, and the signal to interference plus noise ratio that is of each group of antenna ports in the channel state information-reference signal configuration and that is obtained when there is the interference outside the coordinating cluster.

It should be noted that this step is an optional step (represented by a dashed line in the figure), to be specific, the terminal device may alternatively enable the base station to obtain the channel and interference measurement result in another manner, for example, the channel and interference measurement result is carried in another uplink message that is sent by the terminal device to the base station.

Further, the following steps may be further included (not shown): the base station receives a measurement result of each group of antenna ports reported by the terminal device based on the instruction information; and the base station obtains channel and interference measurement results under various interference hypotheses through analysis based on the measurement result.

Specifically, the various interference hypotheses include that when a TP in the coordinating cluster provides a service, no other TP, or one or more other TPs, or all other TPs in the coordinating cluster interfere with the serving TP. To be specific, the base station receives and obtains the channel measurement result obtained by the terminal device through measurement on each group of antenna ports, and may obtain a measurement result of interference of another TP to a particular serving TP through estimation, the interference measurement result may be approximately equal to a channel measurement result of the another TP, and the interference measurement result may include the interference outside the coordinating cluster. The base station may further accurately obtain, based on the measurement result that is of the interference outside the coordinating cluster and that is obtained by the terminal device through measurement, an interference measurement result when the interference outside the coordinating cluster is removed.

According to the technical solution of this embodiment of the present invention, when the measurement parameters of the channel state information are configured for the terminal device, the terminal device is instructed, by using the quasi-co-location indication, to measure the channel state information on each group of antenna ports, and it is unnecessary that each interference hypothesis corresponds to a channel state information process to perform separate resource and signaling configuration, reducing resource overheads and signaling overheads of the base station.

The following further describes this embodiment of the present invention in detail by using a specific example. A scenario in which three network elements perform coordinated transmission shown in FIG. 1 is still used as an example to describe the channel and interference measurement for the coordinated multipoint transmission in this embodiment of the present invention, and specifically describe a resource configuration at a physical layer of the network element and signaling transmission at a higher layer, and the network element is a TP. The resource configuration at the physical layer is the measurement parameters for configuring the CSI, and the measurement parameters include the NZP CSI-RS configuration, the quasi-co-location indication, the ZP CSI-RS configuration, and an indication message. The NZP CSI-RS configuration and the ZP CSI-RS configuration each may include a plurality of antenna ports, a plurality of CSI-RS ports in the NZP CSI-RS configuration may be classified into three groups, and the quasi-co-location indication is used to indicate whether the three groups of ports have the quasi-co-location relationship.

It should be noted that the TP is transparent to the terminal device. The terminal device can only learn, based on the quasi-co-location indication, whether the three groups of ports have the quasi-co-location relationship, and does not learn of a specific TP corresponding to each of the three groups of ports. Only for ease of description, the following depicts that the terminal device measures a channel and interference measurement result of a TP1, a TP2, or a TP3. However, the terminal device actually measures a channel and interference measurement result of each group of ports. Therefore, it may be set that the three groups of ports do not have the quasi-co-location relationship. It may be assumed that a first group of ports correspond to the TP1, a second group of ports correspond to the TP2, and a third group of ports correspond to the TP3.

Figure 4:
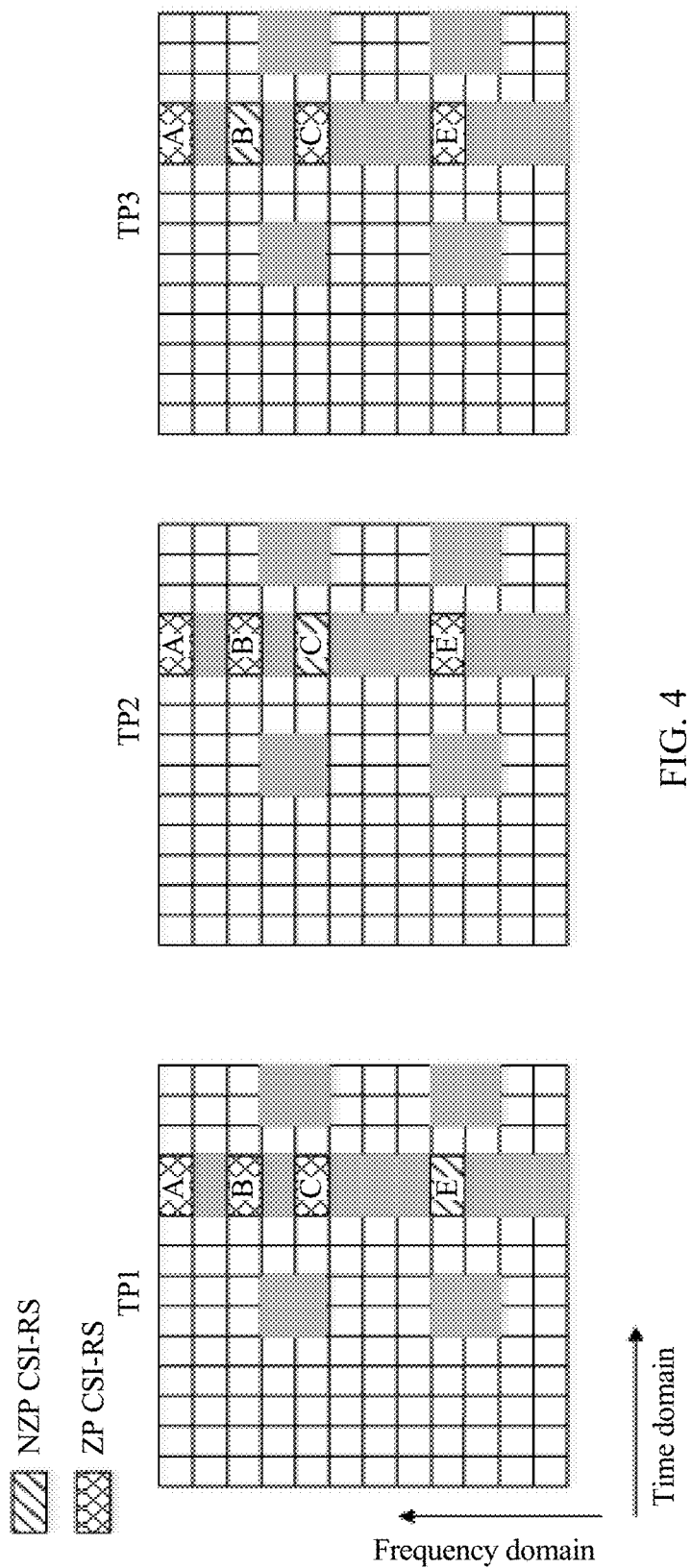
FIG. 4 is an example of a schematic diagram of a resource configuration of channel and interference measurement according to an embodiment of the present invention.

For NZP CSI-RS and ZP CSI-RS configurations, FIG. 4 is an example of a schematic diagram of a resource configuration of channel and interference measurement according to an embodiment of the present invention. As shown in FIG. 4, a reference signal at a resource location E is used to perform TP1 channel measurement. In this case, a TP2 and a TP3 are silent, and a terminal device may obtain a channel $S_E$ between a TP1 and the terminal device, and may estimate, by using the $S_E$, an interference strength $I_E$ caused by the TP1 to the terminal device when the TP2 or the TP3 transmits data to the terminal device. Likewise, a channel $S_C$ between the TP2 and the terminal device is obtained through measurement by using a reference signal at a resource location C, and an interference strength $I_C$ caused by the TP2 to the terminal device when the TP1 or the TP3 transmits data to the terminal device may be estimated by using the $S_C$. A channel $S_B$ between the TP3 and the terminal device is obtained through measurement by using a reference signal at a resource location B, and an interference strength $I_B$ caused by the TP3 to the terminal device when the TP1 or the TP2 transmits data to the terminal device may be estimated by using the $S_B$. Reference signals at resource locations E, C, and B are NZP CSI-RSs, the resource locations E, C, and B each correspond to a port group, and the port group may include a quantity of ports such as 1, 2, 4, 8, 12, or 16. In addition, a reference signal at a resource location A is used to measure interference outside an entire coordinating cluster, to obtain a signal strength $I_{out}$ of the interference outside the entire coordinating cluster, and the reference signal at the resource location A is a ZP CSI-RS. It can be learned that to implement three-TP coordination, four resource locations need to be configured to complete the channel and interference measurement.

An indication for reporting a measurement result by the terminal device may be in an indication manner in LTE, or a new report manner may be defined. If the indication for reporting the measurement result by the terminal device in LTE is used, referring to Table 3, the terminal device reports a CQI for each interference hypothesis. In the new report manner, a base station may send signaling "cqi-Report-new" to notify the terminal device. Several possible report manners are as follows.

Manner 1: A channel measurement result of each configured NZP CSI-RS and a measurement result of the interference outside the coordinating cluster are reported, that is, $\{S_E, S_B, S_C, I_{OUT}\}$.

Manner 2: It is assumed that there is the interference outside the coordinating cluster, and a corresponding SINR of each configured NZP CSI-RS and a measurement result of the interference outside the coordinating cluster are reported, that is, $$\left\{\frac{S_E}{I_{OUT}}, \frac{S_B}{I_{OUT}}, \frac{S_C}{I_{OUT}}, I_{OUT}\right\}.$$

Manner 3: It is assumed that all other TPs cause interference, and a corresponding SINR of each configured NZP CSI-RS and a measurement result of the interference outside the coordinating cluster are reported, that is, $$\left\{\frac{S_E}{I_B + I_C + I_{OUT}}, \frac{S_B}{I_E + I_C + I_{OUT}}, \frac{S_B}{I_E + I_C + I_{OUT}}, I_{OUT}\right\}.$$

Manner 4: A corresponding channel measurement result of each configured NZP CSI-RS and a measurement result of the interference outside the coordinating cluster are reported when the interference outside the cluster is removed, that is, $\{(S_E-I_{OUT}), (S_C-I_{OUT}), (S_B-I_{OUT}), I_{OUT}\}$.

The base station may obtain a channel and interference measurement result under each interference hypothesis based on a measurement result reported in any one of the foregoing manners, to more properly perform scheduling. The foregoing enumerates several possible report manners. The new manner of reporting the measurement result by the terminal device includes but is not limited to the foregoing several manners. The foregoing several manners are merely several combinations of content that indicates the measurement result reported by the terminal device in the foregoing embodiment, and certainly, another report manner may also be obtained through combination.

The base station sends measurement parameters of channel state information to the terminal device by using higher layer signaling. In RRC signaling, the base station defines control signaling in a form of an RRC IE (configuration information is included in the control signaling).

As shown in Table 4, an NZP CSI-RS configuration is specifically represented as an RRC IE: csi-RS-ConfigNZP. As shown in Table 5, a ZP CSI-RS configuration is specifically represented as another RRC IE: csi-RS-ConfigZP.

In addition, to support a configuration change of a physical layer in coordinated multipoint transmission in this embodiment, signaling for transmitting the measurement parameters is also correspondingly changed, which is specifically shown in Table 6.

After receiving the measurement parameters, the terminal device performs channel measurement on three groups of ports to obtain a channel measurement result shown in Table 7. The base station may estimate, based on the channel measurement result, possible interference caused by the three groups of ports in the coordinating cluster, as shown in Table 7:

TABLE 7

Example of channel measurement of a terminal device and interference estimation of a base station

| Resource | Channel measurement | Interference estimation | TP1 | TP2 | TP3 |
|---|---|---|---|---|---|
| E | $S_E$ | $I_E \approx S_E$ | NZP CSI-RS | ZP CSI-RS | ZP CSI-RS |
| C | $S_C$ | $I_C \approx S_C$ | ZP CSI-RS | NZP CSI-RS | ZP CSI-RS |
| B | $S_B$ | $I_B \approx S_B$ | ZP CSI-RS | ZP CSI-RS | NZP CSI-RS |
| A | / | $I_{OUT}$ | ZP CSI-RS | ZP CSI-RS | ZP CSI-RS |

With reference to FIG. 4 and Table 7, interference estimation results under various interference hypotheses when three TPs in this embodiment separately provide a service may be obtained through calculation.

However, from a perspective of a signal strength, $S_B$ measured at the resource location B includes signal energy of the NZP CSI-RS at the resource location B and a signal strength of the interference outside the cluster. Therefore, the signal energy of the NZP CSI-RS at the resource location B can be more accurately estimated by using $S_B - I_{OUT}$, and $I_{OUT}$ is signal energy of the interference outside the coordinating cluster. In this example, $I_{OUT}$ is obtained through separate measurement by using the reference signal at the resource location A. Interference caused by each TP to another TP may be estimated by using a valid signal used when the TP performs channel measurement. For example, when interference caused by the TP1 to another TP is considered, $I_E \approx S_E$. When interference caused by the TP2 to another TP is considered, $I_C \approx S_C$. When interference caused by the TP3 to another TP is considered, $I_B \approx S_B$. Therefore, $I_B$, $I_C$, and $I_E$ include interference caused by the TP3, the TP2, and the TP1 to a serving TP and the signal strength of the interference outside the coordinating cluster measured by the TP3, the TP2, and the TP1. In an example in which an interference hypothesis is that the TP3 interferes, a signal strength that is of the interference caused by the TP3 to the serving TP and that is obtained through estimation is $I_B' = I_B - I_{OUT} \approx S_B - I_{OUT}$. Interference estimation obtained under another interference hypothesis is specifically shown in Table 8.

TABLE 8

Interference estimation results under various interference hypotheses when three TPs in this embodiment separately provide a service

| | Interference hypothesis | Estimation corresponding to various interference hypotheses |
|---|---|---|
| A serving TP is a TP1 | | |
| | Neither a TP2 nor a TP3 interferes | $(S_E - I_{OUT})/I_{OUT}$ |
| | The TP3 interferes | $(S_E - I_{OUT})/(I_E - I_{OUT})$ |
| | The TP2 interferes | $(S_E - I_{OUT})/(I_C - I_{OUT})$ |
| | Both the TP2 and the TP3 interfere | $(S_E - I_{OUT})/(I_B + I_C - 2I_{OUT})$ |
| A serving TP is a TP2 | | |
| | Neither the TP1 nor the TP3 interferes | $(S_C - I_{OUT})/I_{OUT}$ |

TABLE 8-continued

Interference estimation results under various interference hypotheses
when three TPs in this embodiment separately provide a service

| | Interference hypothesis | Estimation corresponding to various interference hypotheses |
|---|---|---|
| A serving TP is a TP3 | The TP3 interferes | $(S_C - I_{OUT})/(I_E - I_{OUT})$ |
| | The TP1 interferes | $(S_C - I_{OUT})/(I_E - I_{OUT})$ |
| | Both the TP1 and the TP3 interfere | $(S_C - I_{OUT})/(I_B + I_E - 2I_{OUT})$ |
| | Neither the TP1 nor the TP2 interferes | $(S_B - I_{OUT})/I_{OUT}$ |
| | The TP2 interferes | $(S_B - I_{OUT})/(I_C - I_{OUT})$ |
| | The TP1 interferes | $(S_B - I_{OUT})/(I_E - I_{OUT})$ |
| | Both the TP1 and the TP2 interfere | $(S_B - I_{OUT})/(I_C + I_E - 2I_{OUT})$ |

It should be noted that in Table 8, a signal-to-noise ratio is used to represent estimation corresponding to various interference hypotheses. The signal-to-noise ratio is a ratio of a strength of a received useful signal to a strength of a received interference signal (noise and interference), and actually, may be alternatively indicated by using a strength of an interference signal. It should be noted that in the foregoing table, for ease of expression and understanding, it is assumed that an RI is always 1, and a PMI is always oriented to a direction of a maximum value.

In LTE, when performing interference measurement, the terminal device does not distinguish that measured interference is interference of a TP or the interference outside the coordinating cluster. However, actually, each CSI-IM resource corresponds to an interference hypothesis. CSI-IM measurement corresponding to each CSI process includes interference that is of a TP (the TP is not the serving TP) sending the NZP CSI-RS and that is measured by the terminal device at a particular resource location, and the interference outside the coordinating cluster measured by the terminal device at the resource location. For example, for interference measured at the resource location B, a signal strength of the interference measured at the resource location B is $I_B = I_B' + I_{OUT}$, where $I_B'$ indicates a signal strength of interference measured by the terminal device at the resource location B when the TP3 sends the NZP CSI-RS, and $I_{OUT}$ indicates the signal strength of the interference outside the coordinating cluster measured by the terminal device. When the interference hypothesis is that the TP3 interferes, the signal strength of the interference of the TP3 measured by the terminal device at the resource location B is $I_B' = I_B - I_{OUT}$. Therefore, it can be learned that a measurement result in this embodiment of the present invention is consistent with a measurement result in LTE.

Therefore, in a three-TP coordination scenario illustrated in FIG. 4, this embodiment requires four resource locations and a set of channel and interference measurement configuration parameters to complete interference estimation under the various interference hypotheses.

The foregoing describes in detail the method in the embodiments of the present invention. The following provides an apparatus in the embodiments of the present invention.

Figure 5:
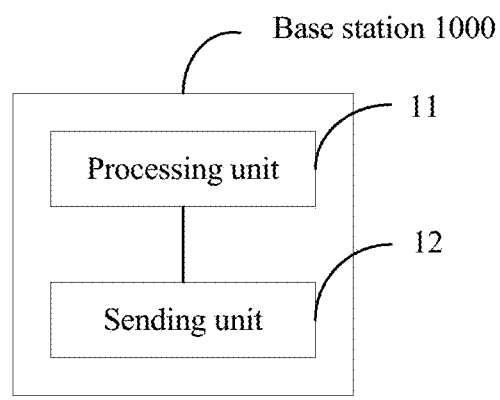
FIG. 5 is a schematic structural diagram of a base station according to an embodiment of the present invention.

FIG. 5 is a schematic structural diagram of a base station according to an embodiment of the present invention, and the base station may be applied to the system shown in FIG. 1. The base station 1000 may include a processing unit 11 and a sending unit 12. The processing unit 11 is configured to: control an operation of the base station, for example, perform S10, and configure measurement parameters for a terminal device. The sending unit 12 is configured to communicate with the terminal device, for example, may perform S102, and is configured to send the measurement parameters to the terminal device. The base station may further include a receiving unit (not shown), configured to communicate with the terminal device. For example, the receiving unit may perform S104, and is configured to receive a measurement result reported by the terminal device. For details, refer to the description in the method embodiment. Details are not described herein again.

Further, the base station 1000 may further include the following unit (not shown): an analysis unit, configured to obtain channel and interference measurement results under various interference hypotheses through analysis based on the measurement result.

The base station receives and obtains a channel measurement result obtained by the terminal device through measurement on each group of antenna ports, and may obtain a measurement result of interference of another TP to a serving TP through estimation, the interference measurement result may be approximately equal to a channel measurement result of the another TP, and the interference measurement result may include interference outside a coordinating cluster. The base station may further accurately obtain, based on a measurement result that is of the interference outside the coordinating cluster and that is obtained by the terminal device through measurement, an interference measurement result when the interference outside the coordinating cluster is removed.

According to the technical solution of this embodiment of the present invention, when the measurement parameters of channel state information are configured for the terminal device, the terminal device is instructed, by using a quasi-co-location indication, to measure the channel state information on each group of antenna ports, and it is unnecessary that each interference hypothesis corresponds to a channel state information process to perform separate resource and signaling configuration, reducing resource overheads and signaling overheads of the base station.

Figure 6:
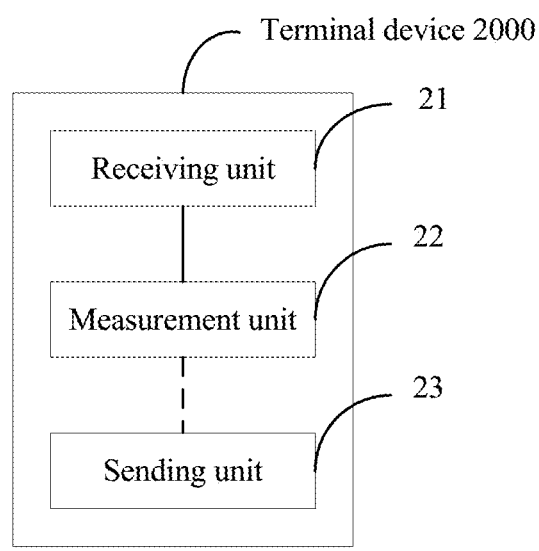
FIG. 6 is a schematic structural diagram of a terminal device according to an embodiment of the present invention.

FIG. 6 is a schematic structural diagram of a terminal device according to an embodiment of the present invention. The terminal device 2000 may include a receiving unit 21 and a measurement unit 22, and may further include a sending unit 23. Detailed descriptions of the units are as follows:

The receiving unit 21 is configured to receive measurement parameters of channel state information from a base station. For example, the base station needs to perform channel and interference measurement for coordinated multipoint transmission, and therefore sends the measurement parameters of the channel state information to the terminal device. The receiving unit 21 of the terminal device receives the measurement parameters of the channel state information from the base station. The measurement parameters include a channel state information-reference signal configuration and a quasi-co-location indication, the channel state information-reference signal configuration includes configurations of at least two groups of antenna ports, and the quasi-co-location indication is used to indicate whether the at least two groups of antenna ports have a quasi-co-location relationship. Specifically, there is one channel state information-reference signal configuration. For details, refer to the related description in FIG. 3 in the method embodiment. Details are not described herein again.

The measurement unit 22 is configured to measure the channel state information based on the measurement parameters.

For example, after receiving the measurement parameters of the channel state information from the base station, the terminal device obtains the channel state information-reference signal configuration and the quasi-co-location indication that are included in the measurement parameters. Based on a value of the quasi-co-location indication, if the quasi-co-location indication is that the at least two groups of antenna ports included in the channel state information-reference signal configuration do not have the quasi-co-location relationship, the terminal device measures reference signals sent by each group of antenna ports, to obtain a channel measurement result of each group of antenna ports. For details, refer to the related description in S103 in the method embodiment. Details are not described herein again.

The sending unit 23 is configured to report a channel and interference measurement result to the base station based on instruction information. The terminal device reports the channel and interference measurement result to the base station based on the instruction information in the measurement parameters. For details, refer to the description in the method embodiment. Details are not described herein again.

According to the technical solution of this embodiment of the present invention, the terminal device measures the channel state information on each group of antenna ports based on the quasi-co-location indication in the measurement parameters of the channel state information, and it is unnecessary that each interference hypothesis corresponds to a channel state information process to perform separate resource and signaling configuration, reducing resource overheads and signaling overheads of the base station.

Figure 7:
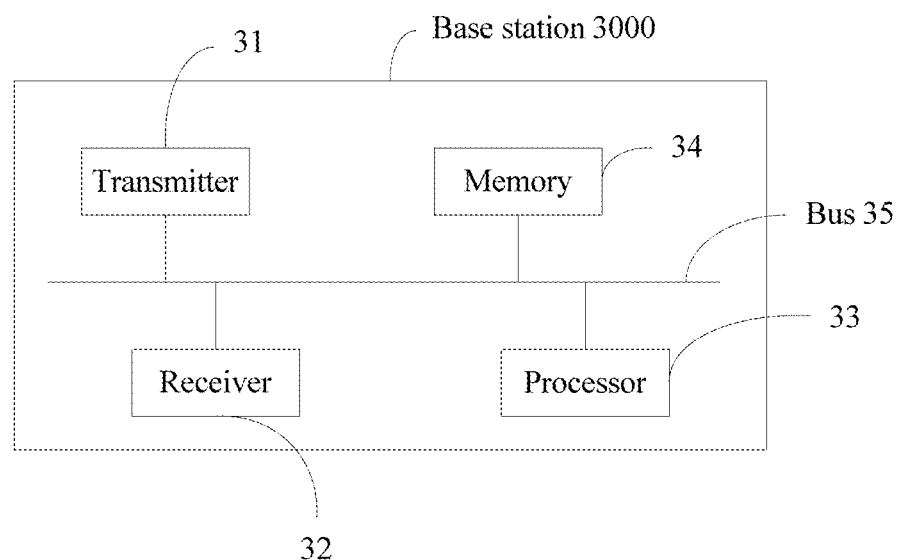
FIG. 7 is a schematic structural diagram of another base station according to an embodiment of the present invention.

FIG. 7 shows another base station 300o according to an embodiment of the present invention. The base station 3000 may include a transmitter 31, a receiver 32, a processor 33, and a memory 34. The transmitter 31, the receiver 32, the processor 33, and the memory 34 are connected to each other by using a bus 35. A related function implemented by the processing unit 11 in FIG. 5 may be implemented by one or more processors 33. A related function implemented by the sending unit 12 in FIG. 5 may be implemented by the transmitter 31. The receiver 32 may also implement a function of the foregoing receiving unit.

The memory 34 includes but is not limited to a random access memory (Random Access Memory, RAM), a read-only memory (ROM), an erasable programmable read only memory (EPROM), or a compact disc read-only memory (CD-ROM). The memory 34 is configured to store related instructions and data. The transmitter 31 is configured to send data and/or a signal, and the receiver 32 is configured to receive data and/or a signal.

The processor 33 may include one or more processors, for example, includes one or more central processing units (CPU). When the processor 33 is one CPU, the CPU may be a single-core CPU, or may be a multi-core CPU.

The processor 33 in the base station 3000 is configured to read program code stored in the memory 34, to perform a base station-related operation in the method embodiment, for example, an operation in S101, to configure measurement parameters of channel state information for a terminal device. For details, refer to the description in the method embodiment. Details are not described herein again.

The transmitter 31 and the receiver 32 are configured to communicate with the terminal device. The transmitter 31 sends the measurement parameters to the terminal device, for example, performs an operation in S102 in the method embodiment. The receiver 32 receives a measurement result sent by the terminal device, for example, performs a base station-related operation in S104 in the method embodiment. For details, refer to the description in the method embodiment. Details are not described herein again.

According to the technical solution of this embodiment of the present invention, when the measurement parameters of the channel state information are configured for the terminal device, the terminal device is instructed, by using a quasi-co-location indication, to measure the channel state information on each group of antenna ports, and it is unnecessary that each interference hypothesis corresponds to a channel state information process to perform separate resource and signaling configuration, reducing resource overheads and signaling overheads of the base station.

Figure 8:
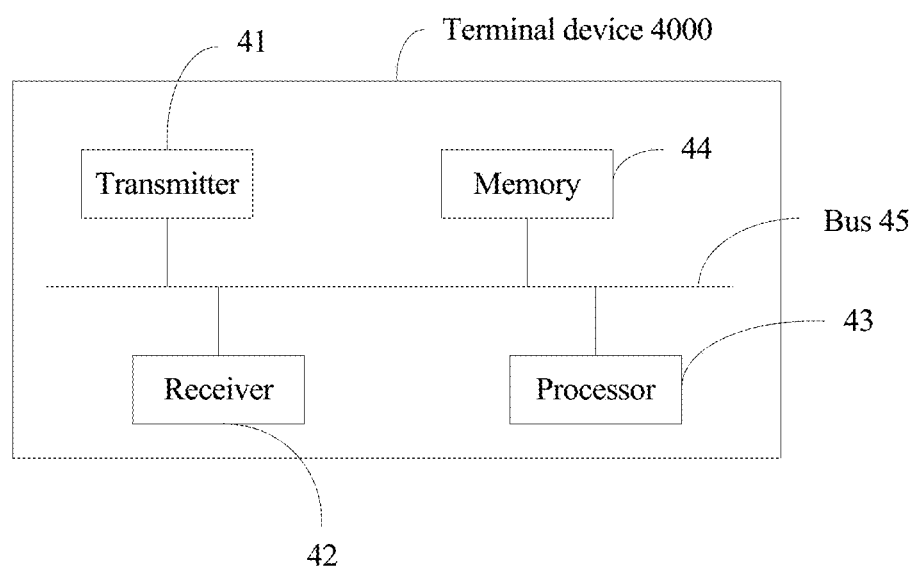
FIG. 8 is a schematic structural diagram of another terminal device according to an embodiment of the present invention.

FIG. 8 shows another terminal device 400o according to an embodiment of the present invention. The terminal device 4000 may include a transmitter 41, a receiver 42, a processor 43, and a memory 44. The transmitter 41, the receiver 42, the processor 43, and the memory 44 are connected to each other by using a bus 45.

The memory 44 includes but is not limited to a random access memory, a read-only memory, an erasable programmable read-only memory, or a compact disc read-only memory. The memory 44 is configured to store related instructions and data. The transmitter 41 is configured to send data, and the receiver 42 is configured to receive data.

The processor 43 may be one or more central processing units. When the processor 43 is one CPU, the CPU may be a single-core CPU, or may be a multi-core CPU.

The processor 43 in the terminal device 4000 is configured to read program code stored in the memory 44, to perform the following operations: receiving measurement parameters of channel state information from a base station, and performing channel measurement based on the measurement parameters, where for the measurement parameters and a channel measurement manner, refer to the related descriptions in the method embodiment.

For example, if at least two groups of antenna ports do not have a quasi-co-location relationship, the processor 43 controls the terminal device 4000 to measure, based on a non zero power channel state information-reference signal configuration, the channel state information at time-frequency locations corresponding to each group of antenna ports.

In another implementation, configurations of the at least two groups of antenna ports are included in the non zero power channel state information-reference signal configuration.

In another implementation, a channel state information-reference signal configuration further includes a zero power channel state information-reference signal configuration, the zero power channel state information-reference signal configuration is used to instruct the terminal device to measure interference outside a coordinating cluster at a time-frequency location corresponding to a corresponding antenna port, and the coordinating cluster includes a plurality of transmission points that perform coordinated transmission.

The operation of measuring the channel state information based on the measurement parameters by the processor 43 further includes: measuring, based on the zero power channel state information-reference signal configuration, the interference outside the coordinating cluster at the time-frequency location corresponding to the corresponding antenna port.

In another implementation, that a quasi-co-location indication is used to indicate whether the at least two groups of antenna ports have a quasi-co-location relationship is that the quasi-co-location indication is used to indicate whether channel state information reference signals sent by the at least two groups of antenna ports are from a same transmission point.

In another implementation, that a quasi-co-location indication is used to indicate whether the at least two groups of antenna ports have a quasi-co-location relationship is that the quasi-co-location indication is used to indicate whether channel state information reference signals sent by the at least two groups of antenna ports are from a same beam group.

In another implementation, the measurement parameters include instruction information, used to instruct the terminal device to report at least one of the following: a channel energy value of each group of antenna ports in the channel state information-reference signal configuration, an interference energy value outside the coordinating cluster, a signal to interference plus noise ratio of each group of antenna ports in the channel state information-reference signal configuration when the interference outside the coordinating cluster is removed, and a signal to interference plus noise ratio of each group of antenna ports in the channel state information-reference signal configuration when there is the interference outside the coordinating cluster.

The processor 43 further performs the following operation: reporting a channel and interference measurement result to the base station based on the instruction information.

In another implementation, a configuration of the antenna port includes a quantity of antenna ports, a resource configuration, and a time unit configuration.

According to the technical solution of this embodiment of the present invention, the terminal device measures the channel state information on each group of antenna ports based on the quasi-co-location indication in the measurement parameters of the channel state information, and it is unnecessary that each interference hypothesis corresponds to a channel state information process to perform separate resource and signaling configuration, reducing resource overheads and signaling overheads of the base station.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium includes: any medium that can store program code, such as a ROM or a random access memory RAM, a magnetic disk or an optical disc, or the like.

What is claimed is:

1. A method, comprising:
configuring, by a base station, a plurality of measurement parameters for a terminal device to use to measure channel state information, wherein the measurement parameters comprise a channel state information-reference signal configuration and a quasi-co-location indication, the channel state information-reference signal configuration comprises configurations of at least two groups of antenna ports, and the quasi-co-location indication indicates whether the at least two groups of antenna ports have a quasi-co-location relationship such that a first large-scale property of a first channel in which a first group of the at least two groups of antenna ports transmits is inferable from a second large-scale property of a second channel in which a second group of the at least two groups of antenna ports transmits; and
sending, by the base station to the terminal device, the plurality of measurement parameters to the terminal device.

2. The method according to claim 1, wherein the channel state information-reference signal configuration comprises a non zero power channel state information-reference signal configuration, and the non zero power channel state information-reference signal configuration instructs the terminal device to measure channel state information at time-frequency locations corresponding to each group of antenna ports in the at least two groups of antenna ports.

3. The method according to either of claim 2, wherein the channel state information-reference signal configuration further comprises a zero power channel state information-reference signal configuration, the zero power channel state information-reference signal configuration instructs the terminal device to measure interference outside a coordinating cluster at a time-frequency location corresponding to a corresponding antenna port, and the coordinating cluster comprises a plurality of transmission points that perform coordinated transmission.

4. The method according to claim 3, wherein the plurality of measurement parameters comprises instruction information instructing the terminal device to report the following:
a channel energy value of each group of antenna ports in the at least two groups of antenna ports, an interference energy value outside the coordinating cluster, a signal to interference plus noise ratio that is of each group of antenna ports in the at least two groups of antenna ports and that is obtained after the interference outside the coordinating cluster is removed, or a signal to interference plus noise ratio that is of each group of antenna ports in the at least two groups of antenna ports and that is obtained when there is the interference outside the coordinating cluster.

5. The method according to claim 1, wherein the quasi-co-location relationship comprises: channel state information reference signals sent by the at least two groups of antenna ports are from a same transmission point, or channel state information reference signals sent by the at least two groups of antenna ports are from a same beam group.

6. A method, comprising:
receiving, by a terminal device from a base station, a plurality of measurement parameters for measuring channel state information, wherein the plurality of measurement parameters comprises a channel state information-reference signal configuration and a quasi-co-location indication, the channel state information-reference signal configuration comprises configurations of at least two groups of antenna ports, and the quasi-co-location indication indicates whether the at least two groups of antenna ports have a quasi-co-location relationship such that a first large-scale property of a first channel in which a first group of the at least two groups of antenna ports transmits is inferable from a second large-scale property of a second channel in which a second group of the at least two groups of antenna ports transmits; and
measuring, by the terminal device, the channel state information based on the plurality of measurement parameters.

7. The method according to claim 6, wherein the channel state information-reference signal configuration comprises a non zero power channel state information-reference signal configuration, and the non zero power channel state information-reference signal configuration instructs the terminal device to measure the channel state information at time-frequency locations corresponding to each group of antenna ports in the at least two groups of antenna ports; and
wherein measuring the channel state information based on the plurality of measurement parameters comprises:
when the at least two groups of antenna ports do not have the quasi-co-location relationship, measuring, based on the non zero power channel state information-reference signal configuration, the channel state information at the time-frequency locations corresponding to each group of antenna ports of the at least two groups of antenna ports.

8. The method according to claim 7, wherein the configurations of the at least two groups of antenna ports are comprised in the non zero power channel state information-reference signal configuration.

9. The method according to claim 6, wherein the channel state information-reference signal configuration further comprises a zero power channel state information-reference signal configuration, the zero power channel state information-reference signal configuration instructs the terminal device to measure interference outside a coordinating cluster at a time-frequency location corresponding to a corresponding antenna port, and the coordinating cluster comprises a plurality of transmission points that perform coordinated transmission; and
wherein measuring the channel state information based on the plurality of measurement parameters comprises:
measuring, based on the zero power channel state information-reference signal configuration, the interference outside the coordinating cluster at the time-frequency location corresponding to the corresponding antenna port.

10. The method according to claim 9, wherein the plurality of measurement parameters comprise instruction information instructing the terminal device to report the following:
a channel energy value of each group of antenna ports of the at least two groups of antenna ports, an interference energy value outside the coordinating cluster, a signal to interference plus noise ratio that is of each group of antenna ports of the at least two groups of antenna ports and that is obtained after the interference outside the coordinating cluster is removed, or a signal to interference plus noise ratio that is of each group of antenna ports of the at least two groups of antenna ports and that is obtained when there is the interference outside the coordinating cluster; and wherein the method further comprises:
reporting a channel and interference measurement result to the base station based on the instruction information.

11. The method according to claim 6, wherein the quasi-co-location relationship comprises: channel state information reference signals sent by the at least two groups of antenna ports are from a same transmission point, or channel state information reference signals sent by the at least two groups of antenna ports are from a same beam group.

12. A base station, comprising:
a receiver;
a transmitter;
a non-transitory memory; and
at least one processor, wherein the non-transitory memory stores a set of program code, and the at least one processor is configured to invoke the set of program code stored in the non-transitory memory to:
configure a plurality of measurement parameters for a terminal device to use to measure channel state information, wherein the plurality of measurement parameters comprise a channel state information-reference signal configuration and a quasi-co-location indication, the channel state information-reference signal configuration comprises configurations of at least two groups of antenna ports, and the quasi-co-location indication indicates whether the at least two groups of antenna ports have a quasi-co-location relationship such that a first large-scale property of a first channel in which a first group of the at least two groups of antenna ports transmits is inferable from a second large-scale property of a second channel in which a second group of the at least two groups of antenna ports transmits; and
sending the plurality of measurement parameters to the terminal device using the transmitter.

13. The base station according to claim 12, wherein the channel state information-reference signal configuration comprises a non zero power channel state information-reference signal configuration, and the non zero power channel state information-reference signal configuration instructs the terminal device to measure the channel state information at time-frequency locations corresponding to each group of antenna ports in the at least two groups of antenna ports.

14. The base station according to claim 12, wherein the channel state information-reference signal configuration further comprises a zero power channel state information-reference signal configuration, the zero power channel state information-reference signal configuration instructs the terminal device to measure interference outside a coordinating cluster at a time-frequency location corresponding to a corresponding antenna port, and the coordinating cluster comprises a plurality of transmission points that perform coordinated transmission.

15. The base station according to claim 14, wherein the plurality of measurement parameters comprises instruction information instructing the terminal device to report the following:
a channel energy value of each group of antenna ports in the at least two groups of antenna ports, an interference energy value outside the coordinating cluster, a signal to interference plus noise ratio that is of each group of antenna ports in the at least two groups of antenna ports and that is obtained after the interference outside the coordinating cluster is removed, or a signal to interference plus noise ratio that is of each group of antenna ports in the at least two groups of antenna ports and that is obtained when there is the interference outside the coordinating cluster.

16. The base station according to claim 12, wherein the quasi-co-location relationship comprises: channel state information reference signals sent by the at least two groups of antenna ports are from a same transmission point, or channel state information reference signals sent by the at least two groups of antenna ports are from a same beam group.

17. A terminal device, comprising:
a receiver;
a transmitter;
a non-transitory memory; and
at least one processor, wherein the non-transitory memory stores a set of program code, and the at least one processor is configured to invoke the set of program code stored in the non-transitory memory to:
receive, from a base station using the receiver, a plurality of measurement parameters for measuring channel state information, wherein the plurality of measurement parameters comprises a channel state information-reference signal configuration and a quasi-co-location indication, the channel state information-reference signal configuration comprises configurations of at least two groups of antenna ports, and the quasi-co-location indication indicates whether the at least two groups of antenna ports have a quasi-co-location relationship such that a first large-scale property of a first channel in which a first group of the at least two groups of antenna ports transmits is inferable from a second large-scale property of a second channel in which a second group of the at least two groups of antenna ports transmits; and
measure the channel state information based on the measurement parameters.

18. The terminal device according to claim 17, wherein the channel state information-reference signal configuration comprises a non zero power channel state information-reference signal configuration, and the non zero power channel state information-reference signal configuration instructs the terminal device to measure the channel state information at time-frequency locations corresponding to each group of antenna ports in the at least two groups of antenna ports; and
wherein measuring the channel state information based on the plurality of measurement parameters comprises:
when the at least two groups of antenna ports do not have the quasi-co-location relationship, measuring, based on the non zero power channel state information-reference signal configuration, the channel state information at the time-frequency locations corresponding to each group of antenna ports of the at least two groups of antenna ports.

19. The terminal device according to claim 18, wherein the channel state information-reference signal configuration further comprises a zero power channel state information-reference signal configuration, the zero power channel state information-reference signal configuration instructs the terminal device to measure interference outside a coordinating cluster at a time-frequency location corresponding to a corresponding antenna port, and the coordinating cluster comprises a plurality of transmission points that perform coordinated transmission; and wherein measuring the channel state information based on the plurality of measurement parameters comprises:
measuring, based on the zero power channel state information-reference signal configuration, the interference outside the coordinating cluster at the time-frequency location corresponding to the corresponding antenna port.

20. The terminal device according to claim 19, wherein the plurality of measurement parameters comprises instruction information instructing the terminal device to report the following:

a channel energy value of each group of antenna ports in the at least two groups of antenna ports, an interference energy value outside the coordinating cluster, a signal to interference plus noise ratio that is of each group of antenna ports in the at least two groups of antenna ports and that is obtained after the interference outside the coordinating cluster is removed, or a signal to interference plus noise ratio that is of each group of antenna ports in the at least two groups of antenna ports and that is obtained when there is the interference outside the coordinating cluster; and wherein the at least one processor is further configured to invoke the set of program code stored in the non-transitory memory to:
report, using the transmitter, a channel and interference measurement result to the base station based on the instruction information.

* * * * *